United States Patent
Hollenstain et al.

(10) Patent No.: US 9,672,719 B1
(45) Date of Patent: Jun. 6, 2017

(54) DEVICE FOR AUTOMATIC CRASH NOTIFICATION

(71) Applicant: STATE FARM MUTUAL AUTOMOBILE INSURANCE COMPANY, Bloomington, IL (US)

(72) Inventors: Thomas Hollenstain, Le Roy, IL (US); Shawn C. Bennett, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/844,979

(22) Filed: Sep. 3, 2015

Related U.S. Application Data

(60) Provisional application No. 62/153,190, filed on Apr. 27, 2015.

(51) Int. Cl.
*G08B 21/18* (2006.01)

(52) U.S. Cl.
CPC .................. *G08B 21/18* (2013.01)

(58) Field of Classification Search
CPC .... G08B 21/18; G08B 21/182; G08B 21/187; G08G 1/0175; G08G 1/20; G08G 1/205; G06Q 40/08; H04W 4/00; H04W 4/04; H04W 4/16
See application file for complete search history.

(56) References Cited

U.S. PATENT DOCUMENTS

| | | | | |
|---|---|---|---|---|
| 8,014,789 | B2* | 9/2011 | Breed | B60C 11/24 340/514 |
| 2003/0073406 | A1* | 4/2003 | Benjamin | G08G 1/0962 455/41.1 |
| 2011/0195699 | A1* | 8/2011 | Tadayon | H04B 5/0062 455/418 |
| 2013/0344856 | A1* | 12/2013 | Silver | H04M 1/72577 455/418 |
| 2015/0019266 | A1* | 1/2015 | Stempora | G06Q 40/08 705/4 |
| 2015/0025917 | A1* | 1/2015 | Stempora | G06Q 40/08 705/4 |

* cited by examiner

*Primary Examiner* — Van Trieu
(74) *Attorney, Agent, or Firm* — Marshall, Gerstein & Borun LLP; Randall G. Rueth

(57) ABSTRACT

A method for detecting an event occurring during operation of a vehicle includes receiving indications of a plurality of variables from an installed device communicatively coupled to the mobile device via an internal communication link. The method further includes analyzing the received indications of the plurality of variables to detect the event occurring during the operation of the vehicle. Still further, the method includes, upon detecting the event, initiating: (i) a first communication session between the mobile device and an entity outside of the vehicle, and (ii) a second communication session between the mobile device and the installed device, wherein the mobile device forwards content communicated via the first communication session to the installed device via the second communication session such that the installed device presents the content to the vehicle operator. In one aspect, air pressure wave sensor and accelerometer data may trigger automatic crash notifications to emergency responders.

28 Claims, 7 Drawing Sheets

DEVICE FOR AUTOMATIC CRASH NOTIFICATION

CROSS-REFERENCE TO RELATED APPLICATIONS

This application claims the benefit of U.S. Provisional Patent Application No. 62/153,190, entitled "Device for Automatic Crash Notification," filed Apr. 27, 2015, the disclosure of which is hereby expressly incorporated by reference herein in its entirety.

TECHNICAL FIELD

The present disclosure generally relates to monitoring operation of a vehicle, and, more particularly, to detecting a crash, or other event, with a modified device installed in a vehicle.

BACKGROUND

In recent years, automobile manufacturers, insurance companies, and others have begun equipping and/or retrofitting vehicles with a variety of sensors, interfaces, communicative connections, etc. for monitoring the operation of the vehicles. These systems can provide insights into how a vehicle is being driven, where a vehicle is being driven, if components of a vehicle are failing or need maintenance, and much more. However, many current monitoring systems are installed by the manufacturer of a vehicle or retroactively coupled to data ports, on-board computers, or other couplings built into a vehicle by the manufacturer. As such, vehicles that do not come equipped with monitoring systems from the manufacturer and/or do not possess certain types of data ports may not be able to utilize these monitoring systems.

Even if monitoring systems can be coupled to data ports or on-board computers of a vehicle, these attached monitoring systems could have some impact on the performance of the vehicle, given that they are coupled to a data port or on-board computer of the vehicle. For example, an attached monitoring system, attached to a data port or on-board computer of a vehicle, may introduce unexpected current, voltage, or other signals into the electrical and computer system of the vehicle. These unexpected signals may cause the vehicle to stall or operate in a non-ideal manner.

BRIEF SUMMARY

The present embodiments may, inter alia, allow the operation of a vehicle to be monitored and allow communications or data transfers to be initiated based upon the monitored operation. Installed devices of the present embodiments may gather data, such as location, speed, acceleration, and sound data, and transfer this data to mobile and/or remote devices, such as a smartphone, tablet computers, wearable computing devices, smart glasses, smart watches, servers, etc. In turn, the mobile and/or remote devices may analyze the transferred data to determine if certain events occurred during operation of the vehicle, if communications are to be initiated between the vehicle and external entities, and/or if certain backend processes are to be adjusted.

In one aspect, a method for detecting an event occurring during operation of a vehicle may be provided. The method may include, during the operation of the vehicle by a vehicle operator, receiving, at a mobile device, indications of a plurality of variables from an installed device communicatively coupled to the mobile device via an internal communication link, wherein: the plurality of variables are monitored by the installed device during the operation of the vehicle, the mobile device is one of a smartphone, tablet computer, or wearable computing device, and the installed device is fixedly installed in the vehicle. The method may include analyzing, by an event detection module specifically configuring the mobile device, the received indications of the plurality of variables to detect the event occurring during the operation of the vehicle. The method may also include, upon detecting the event, initiating, by a communication initiation module further configuring the mobile device: (i) a first communication session between the mobile device and an entity outside of the vehicle via an external communication link between the mobile device and the entity, and/or (ii) a second communication session between the mobile device and the installed device via the internal communication link between the mobile device and the installed device, wherein the mobile device forwards content communicated via the first communication session to the installed device via the second communication session such that the installed device presents the content to the vehicle operator. The method may include additional, less, or alternate functions, including those discussed elsewhere herein, and/or the method may be implemented via various processors and/or computer-executable instructions stored on non-transitory computer readable medium or media.

In another aspect, a method of monitoring an operation of a vehicle and communicating information indicative of the operation may be provided. The method may include during a time period in which the vehicle is operated by a vehicle operator, monitoring, by a data gathering module specifically configuring an installed device: (i) a location of the vehicle with geopositioning sensors, (ii) sounds within the vehicle with microphones, and/or (iii) an acceleration of the vehicle with accelerometers, wherein the installed device is fixedly installed within the vehicle. The geopositioning sensors, the microphones, and/or the accelerometers are built into the installed device. The method may include, at each of a plurality of times during the time period: generating, by a data aggregation module specifically configuring the installed device, a burst of data including indications of the location of the vehicle, the sounds within the vehicle, and/or the acceleration of the vehicle monitored during a part of the time period preceding the time, and/or transferring, by a data communication module specifically configuring the installed device, the burst of data to a mobile device via a wireless communicative coupling, wherein the mobile device may be one of a smartphone, a tablet computer, and/or a wearable computing device temporarily disposed within the vehicle. The method may include additional, less, or alternate functions, including those discussed elsewhere herein and/or the method may be implemented via various processors and/or computer-executable instructions stored on non-transitory computer readable medium or media.

In yet another aspect, a computer system for detecting events occurring during an operation of a vehicle may be provided. The system may include an internal communicative coupling between a mobile device and an installed device. The mobile device may be one of a smartphone, tablet computer, or wearable computer temporarily disposed in the vehicle, and the installed device may be fixedly installed in the vehicle, and an external communicative coupling may be between the mobile device and an external entity, wherein the external entity is outside of the vehicle. The system may include the mobile device, wherein the mobile device is specifically configured by computer-executable instructions stored on a non-transitory memory of the mobile device such that, when executed by one or more processors of the mobile device, the computer-executable instructions cause the mobile device to: during the operation of the vehicle by a vehicle operator, receive, at a mobile device via the internal communicative coupling, indications of a plurality of variables from the installed device, wherein the plurality of variables are monitored by the installed device during the operation of the vehicle. The computer-executable instructions further cause the mobile device to analyze the received indications of the plurality of variables to detect an event occurring during the operation of the vehicle, and, upon detecting the event, at least one of: (i) initiate an external communication session between the mobile device and the external entity via the external communication link, or (ii) transmit at least some of the received indications of the plurality of variables to the external entity via the external communication link. The system may include additional, less, or alternate functionality, including that discussed elsewhere herein.

In still another aspect, an installed device for monitoring an operation of a vehicle may be provided. The device may include an operational coupling between the installed device and the vehicle, wherein the operational coupling couples the installed device to the vehicle as a head unit, and a communicative coupling between the installed device and a mobile device. The mobile device may be one of a smartphone, tablet computer, or wearable computer temporarily disposed in the vehicle. The installed device further includes one or more sensors configured to, during a time period corresponding to the operation of the vehicle, monitor: (i) a location of the vehicle, (ii) sounds within the vehicle, and/or (iii) an acceleration of the vehicle, and generate indications of the location of the vehicle, the sounds within the vehicle, and the acceleration of the vehicle. The installed device still further includes a data aggregation module and a data communication module, wherein, at each of a plurality of times during the time period: the data aggregation module generates a burst of data including indications of the location of the vehicle, the sounds within the vehicle, and/or the acceleration of the vehicle monitored during a part of the time period preceding the time, and the data communication module transmits the burst of data to a mobile device via the communicative coupling. The device may include additional, less, or alternate functionality, including that discussed elsewhere herein.

BRIEF DESCRIPTION OF THE DRAWINGS

There are shown in the drawings arrangements which are presently discussed, it being understood, however, that the present aspects are not limited to the precise arrangements and instrumentalities shown, wherein.

Figure 1:
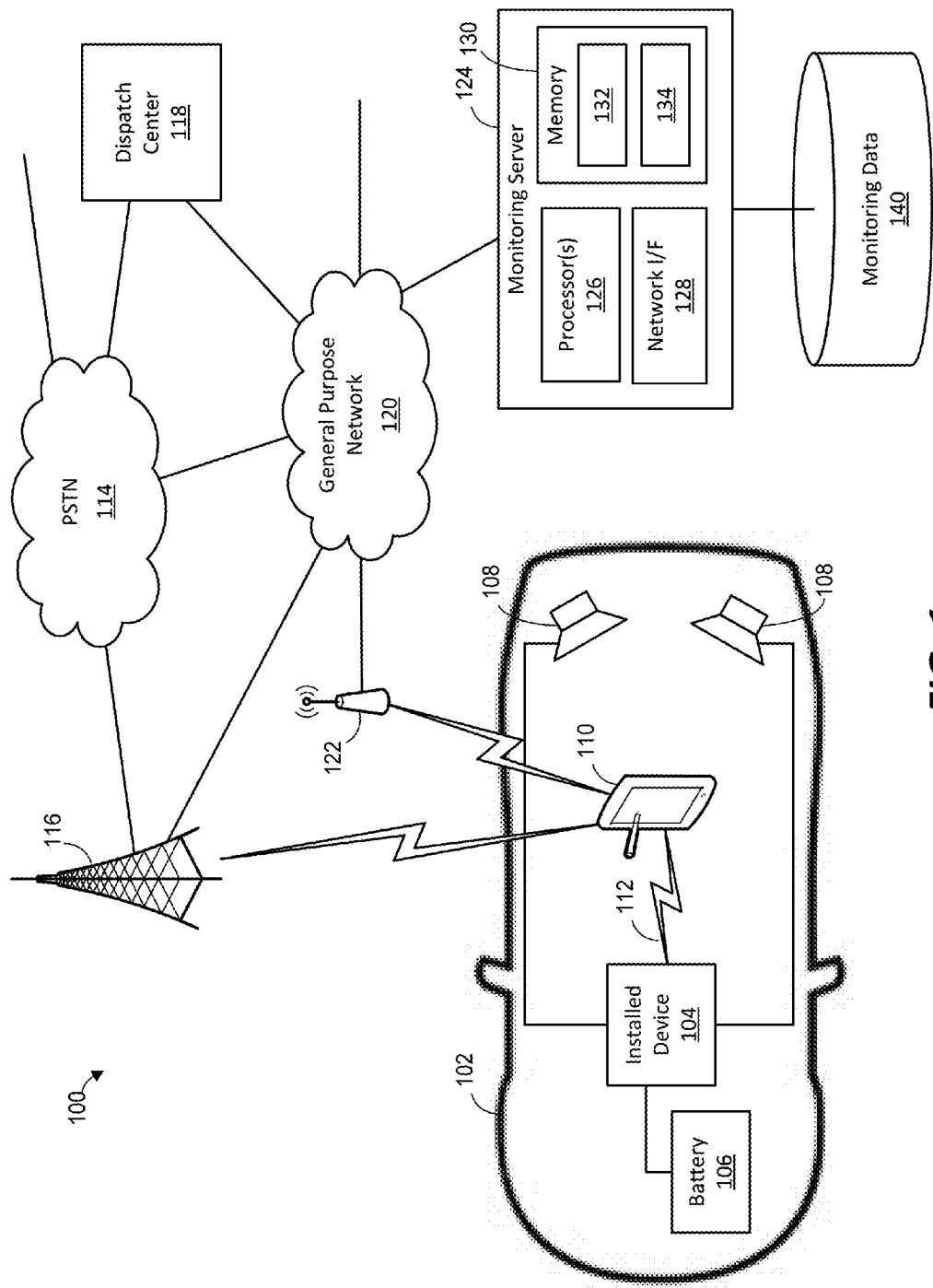
FIG. 1 is a simplified and exemplary block diagram of a system for monitoring operation of a vehicle.

The figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

The present embodiments relate to, inter alia, a telematics enabled stereo/infotainment device that may include a feature for automatic crash notification (ACN). A system and method may include the incorporation of (i) a 3 angle accelerometer; (ii) GPS (Global Positioning System) unit; (iii) air pressure wave sensor; (iv) Bluetooth connectivity; (v) hands free phone capability; (vi) a buffer memory, and/or (vii) the ability to run an application ("app") into a vehicle stereo/infotainment head unit. The head unit may communicate with and/or leverage the telecom and data plans of a linked smartphone (or other mobile device configured for wireless communication and/or data transmission) via an app.

In one aspect, an app may run on both the stereo/infotainment head unit and the mobile device. The app may allow accelerometer, GPS, and/or air pressure sensor data to be transmitted to the mobile device. The mobile device may in turn use the received data and app to provide information/data to an insurance company remote server. The remote server and/or auto insurance company may use the data received from an insured vehicle or mobile device for drive by mile insurance programs, and/or transmit or otherwise forward crash related data to an emergency response center in the event of a collision (such as via the mobile device's data plan or cellular connection).

In some embodiments, because of the angle at which the stereo/infotainment head unit may be nearly always mounted (in the vehicle center stack) and/or because it may not be square on the vehicles centerline, center of rotation and/or center of roll, it may be necessary for the accelerometer to have a self-calibration feature (at least at time of initial installation) to determine its orientation in space for accurate measurements. This calibration may need to be maintained through a continuous supply of battery power. Some stereo/infotainment head units may receive constant battery power even with the vehicle's key off and removed to maintain the radio presets and clock features. This uninterrupted continuous power may also be used to maintain accelerometer calibration.

Once calibrated, the 3 angle accelerometer may not only be able to detect vehicle acceleration/deceleration, but may also be able to detect angle of impact, impact delta-V, and impact G levels in a vehicle crash. In addition, with the head unit coupled to the vehicle via its hard mount, the measurement accuracy and repeatability may be increased versus a nomadic measure.

The air pressure wave sensor may be able to detect the air pressure wave pulse created by the sound pressure and air displacement pressure waves of an airbag deployment or multiple airbag deployments within the vehicles passenger cabin. This reading may be used as a check redundancy to G levels consistent with a crash of determined severity (at levels consistent with airbag deployment).

The accelerometer, GPS, air pressure wave sensor, buffer memory, and app (working on both on the head unit and in the mobile device) may work in unison to provide periodic telematics data bursts via the mobile device's data plan to the insurance company or its third party vendor for insurance drive by mile programs.

The head unit and app may detect a vehicle crash with an airbag deployment using a fusion of the vehicle stereo/infotainment head unit's 3 angle accelerometer, GPS, and/or air pressure wave sensor. This fusion of sensor inputs may increase accuracy and help filter out false positives.

When the app sees/receives input from the vehicle stereo/infotainment head unit embedded sensors showing a high-G event and/or a large air pressure pulse, and a subsequent zero vehicle speed as detected by the GPS the app in the vehicle stereo/infotainment head unit, that variables may trigger an automatic crash notification sequence to begin. The exact thresholds and sequencing may be controlled algorithmically based upon modeling of specific crash events.

The vehicle stereo/infotainment head unit using the app may communicate with the mobile device (such as a smartphone, smart glasses, smart watch, tablet, etc.) via Bluetooth connection and send data to the mobile device. This data may include acceleration G data, calculated angle of impact data, GPS location coordinates, GPS speed, GPS accuracy, etc. The app on the mobile device may then initiate an automatic crash notification (ACN) call via cellular connection.

Once an emergency call center is contacted, voice communications with the emergency call center may be handled by the mobile device and/or hands-free Bluetooth phone feature of the stereo/infotainment head unit making communication with the vehicle occupants possible. The G data, calculated angle of impact data, GPS location coordinates, etc. may be transmitted to the emergency call center. Short Message Service/SMS or text messaging may also be utilized.

The present embodiments may provide several benefits. For instance, the present embodiments may be (1) adopted by vehicle manufacturers as a low cost option for a telematics system and automatic collision notification (ACN) system; and/or (2) adopted by aftermarket stereo/infotainment head unit manufacturers so the system may be retrofitted to virtually any vehicle, enabling it to have both telematics (including drive by mile insurance applications) and automatic crash notification (ACN) features when paired with apps and a smartphone or other mobile device. The aftermarket head unit version of this device may be added to any passenger car, light truck, motorhome or other motor vehicle with a stereo/infotainment mounting area that conforms to the single Deutsches Institut für Normung (DIN) car audio size standard (180×50 mm panel) or double DIN standard (180×100 mm panel), also known as ISO 7736 standard.

Further, stereo/infotainment head units may be almost nearly always mounted on the vehicles centerline in the center stack area. This area may also be near the vehicles center of rotation and center of roll making it a nearly ideal spot to mount a 3 angle accelerometer and improved accuracy over telematics devices that mount to other locations (i.e., the On Board Diagnostic II (OBD-II DLC) port, sun visor, etc.). The stereo/infotainment head unit may be solidly mounted in the vehicle, thereby increasing accelerometer accuracy greatly over using the accelerometer in a smartphone (or mobile device) that is in a pocket or unsecured or elsewhere in the vehicle.

Stereo/infotainment head units may also be supplied with constant battery power or 12-volt power to maintain the radio station presets. This feature may allow the accelerometer to receive constant power and/or remain calibrated.

In some embodiments, utilizing the GPS and accelerometer functions of the stereo/infotainment head unit may reduce battery demand on the smartphone. This may alleviate the impact of running the GPS unit in the smartphone constantly, which may deplete the Smartphone's battery rapidly.

The present device and operating model may maintain separation from the vehicle's data bus and Electronic Control Modules (ECUs). The separation may ensure that the functionality is not dependent upon and/or will not able to affect the vehicle's operating systems.

The device may be capable of gathering, collecting, generating, receiving, and/or wirelessly transmitting information for both insurance drive by mile and automatic crash notification proposes. The types of information generated, collected, gathered, received, and/or transmitted (such as from various vehicle-mounted systems and sensors, and/or remote servers/processors) may include, or be associated with or related to: (a) vehicle speed via GPS speed information; (b) vehicle location via GPS coordinates; (c) direction of vehicle travel via GPS and accelerometers; (d) rate of acceleration/deceleration in three axes via an embedded multi-axis accelerometer; (e) angle of impact via an embedded multi-axis accelerometer; (f) impact delta-V and calculated impact acceleration via accelerometers; and/or (g) deployment of inflatable restraints (airbags) detected by air pressure wave sensor. Other types of information and data may be used.

In one embodiment, a telematics enabled vehicle stereo/infotainment device/head unit that includes accelerometers, Global Positioning System (GPS), air pressure wave sensor and a feature for automatic crash notification (ACN) may be provided. Incorporation of Global Positioning System (GPS), multi axes accelerometers, air pressure wave sensor, buffer memory, Bluetooth connectivity, the ability to run an app, and/or the ability to communicate with a Smartphone and leverage its data plan into an infotainment head unit for telematics and automatic crash notification (ACN) purposes may be beneficial for road safety, accident assistance, and/or auto insurance purposes. In other embodiments, instead a dedicated head unit, a mobile device (such as a smartphone) may be configured with the same or similar functionality.

Exemplary Embodiments

The present embodiments may relate to, inter alia, systems and methods for monitoring the operation of a vehicle and initiating communications or data transfers based upon the monitored operation. Installed devices of the present embodiments may gather data, such as location, speed, acceleration, and/or sound data, and transfer this data to mobile and/or remote devices, such as smartphone, tablet computers, wearable computing devices, servers, etc. In turn, the mobile and/or remote devices may analyze the transferred data to determine if certain events occurred during operation of the vehicle (e.g., collisions), if communications are to be initiated between the vehicle and external entities (e.g., dispatch centers), and/or if certain backend processes (e.g., related to insurance rates) are to be adjusted.

In one aspect, the present embodiments may include an installed device, where the installed device is fixedly installed in a vehicle as a head unit of an entertainment, stereo, radio, infotainment, etc. system of the vehicle. In this manner, the installed device may receive power from the vehicle to operate (even when a motor or engine of the vehicle is off) and/or may be fixedly disposed in a central location within the vehicle. The installed device may include sensors, such as accelerometers, geopositioning sensors, and microphones, as built in components of the installed device. The installed device may monitor the operation of the vehicle and transmit data indicative of the operation to one or more mobile device temporarily disposed in the vehicle (e.g., via Bluetooth connections).

In some aspects, upon communication of data from the installed device to one or more mobile devices (e.g., smartphones or tablet computers) within the vehicle, the one or more mobile devices may analyze at least some of the communicated data to identify certain events occurring during the operation of the vehicle. For example, the one or more mobile devices may identify events including collisions, tire blowouts, emergency health situations (e.g., a driver having a heart attack), etc. Based upon the type of event that is detected, the one or more mobile devices may automatically initiate communications with entities outside of the vehicle, such as emergency dispatch centers or dispatch centers facilitating road side assistance.

In these and/or other aspects, the one or more mobile devices may forward some or all of the data (previously communicated from the installed device) to one or more remote devices via a cellular or other wireless connection. In this manner, "backend" devices, such as servers of an insurance company, may utilize the data for assessing performance of the vehicle or vehicle operator, predicting mechanical issues with the vehicle, determining insurance rates based upon risk associated with a vehicle, developing recommendations for the vehicle operator, etc. The one or more mobile devices may also forward some or all of the data to dispatch centers in conjunction with an initiation of communications between the vehicle and an external entity. Dispatch centers may utilize this information to determine a location of the vehicle, triage likely medical emergencies, assess likely damage to a vehicle, etc.

With conventional techniques, monitoring systems need to be coupled to a data port or on-board computer of a vehicle and/or need to directly communicate gathered data from the monitoring system to outside entities. By utilizing an installed device installed as a head unit in a vehicle, the present embodiments may avoid couplings between installed devices and data ports or on-board computers. Further, by communicating gathered data from the installed device to an onboard mobile device (e.g., a smartphone), the present embodiments may utilize existing connectivity of mobile devices to transmit data and avoid monthly, or other, fees associating with connecting an installed device directly to outside entities.

Exemplary System

FIG. 1 illustrates various aspects of an exemplary system 100 which may facilitate monitoring of the operation of a vehicle 102 and initiating communications between the vehicle 102 and entities outside of the vehicle 102. The high-level architecture may include both hardware components and software applications, as well as various data communications channels for communicating data between the various hardware and software components. Specifically, the system 100 may include various software and hardware components or modules that may employ methods to gather and communicate data about operation of the vehicle 102, determine events occurring during the operation of the vehicle 102, and/or initiate communications between the vehicle 102 and outside entities. At least some of the various modules may be implemented as computer-readable storage memories containing computer-readable instructions (i.e., software) for execution by ones or more processors of the system 100 for monitoring and initiating communications.

The exemplary system 100 shown in FIG. 1 may include additional, fewer, or alternate components, including those discussed elsewhere herein.

Exemplary Components within a Vehicle

Various components of the system 100 may be disposed within the vehicle 102. These components may be in a cabin of the vehicle 102, in an engine compartment of the vehicle 102, in a dash of the vehicle 102, in a trunk of the vehicle 102, or at any other suitable location within the vehicle 102. In some implementations, the components within the vehicle 102 may include components fixedly installed within the vehicle 102, such as an installed device 104, a battery 106, and one or more audio/visual presentation components 108, and components temporarily and removably disposed in the vehicle 102, such as a mobile device 110.

The installed device 104 may be installed in the vehicle 102 (e.g., in a dash of the vehicle 102) as a head unit of a stereo, entertainment, infotainment, etc. system of the vehicle 102. That is, the installed device 104 may be a central interface facilitating the presentation of audio and/or visual content to operators and passengers of the vehicle 102 via the audio/visual presentation components 108. For example, a vehicle operator or passenger may input a compact disc (CD), digital versatile disc (DVD), streaming media (e.g., via a universal serial bus (USB) or stereo jack input), or other content into the installed device 104, and the installed device 104 may present some or all of this content to operators or passengers via the audio/visual presentation components 108. The content may include music, maps, navigations, videos, phone calls, etc., and the audio/visual presentation components 108 may include displays, touchscreens, speakers, microphones, etc.

In addition to facilitating the presentation of audio and/or visual content, the installed device 104 may include various sensors and specialized modules to facilitate a monitoring of the operation of the vehicle 102, in an implementation. Specifically, the installed device 104 may include various sensors and routines, modules, engines, etc. to process and communicate data gathered from the various sensors. These sensors may include sensors to detect location, acceleration, noise (or sound), speed, etc., as further discussed with reference to FIG. 2.

In some implementations, the installed device 104 may communicate data indicative of the operation of the vehicle (location, speed, etc.) to the mobile device 110 via a wireless communicative coupling 112. This wireless communicative coupling 112 may be a Bluetooth or WiFi connection, for example. The installed device 104 and the mobile device 110 may include one or more communication/network modules or interfaces to support this wireless communication functionality, as further discussed with reference to FIGS. 2 and 3.

The battery 106 may at least partially power the installed device 104 via one or more electronic leads or wires, for example. The battery 106 may be an automotive battery, such as a twelve volt lead-acid type battery, that both powers the installed device 104 and other components of the vehicle 102, such as an ignition system. Because the installed device 104 is fixedly installed in the vehicle 102 and operatively coupled to the battery 106, the installed device 104 may calibrate one or more sensors utilized in monitoring the vehicle 102 and maintain the calibration even when an engine or motor of the vehicle 102 is off. Such calibrations are discussed in further detail with reference to FIG. 2.

In an implementation, the mobile device 110 may be a portable personal communication and/or computing device brought into the vehicle 102 by an operator of the vehicle 102 or a passenger in the vehicle 102. By way of example and without limitation, the mobile device 110 may be a smartphone, a tablet computer, a laptop computer, or a wearable computing device (e.g., a smartwatch or head-mounted computing device). In contrast to the installed device 104, the mobile device 110 may only be temporarily and removably disposed in the vehicle 102, and the mobile device 110 may be configured to communicate (e.g., wirelessly) to devices both within the vehicle 102 and outside the vehicle 102.

Exemplary Communication Between Vehicle & Entities

In some implementations, the vehicle 102, or components disposed within the vehicle 102, may be communicatively connected to entities, such as networks, phones, modems, computers, etc., located outside of the vehicle 102. In particular, these communicative connections may facilitate the setup and tear down of calls between the mobile device 110 and external entities, and the communicative connections may allow data, generated by the installed device 104 and indicative of the operation of the vehicle 102, to be transferred from the mobile device 110 to external entities.

In these implementations, the mobile device 110 may be communicatively coupled to a public switched telephone network (PSTN) 114 or other suitable telephone network via one or more cellular base stations, such as the base station 116. Although not shown in FIG. 1, this communicative coupling may include multiple base stations and other components of communications systems, such as switches, gateways, routers, databases, etc. The communicative coupling between the mobile device 110 and the PSTN 114 may allow the mobile device 110 to make/receive calls, send text messages (e.g., short message service (SMS) messages), send/receive emails, etc.

The PSTN 114 may be communicatively connected to one or more dispatch centers, such as the dispatch center 118. In this manner, the mobile device 110 may call or otherwise communicate with (e.g., via text messages) the dispatch center 118. The dispatch center 118 may be an emergency services dispatch center, such as an entity that receives emergency calls (e.g., calls to 911), or a road side assistance dispatch center, such as an entity that receives calls as part of a road side assistance service. Upon receiving calls, the dispatch center 118 may be able to send first responders, towing services, mechanics, insurance claim adjusters, etc. to the location of the vehicle 102. Note, although dispatch centers will be referred to by way of example herein, the mobile device 110 may call or communicate with any number of other entities via the PSTN 114. For example, the mobile device 110 may make direct calls to first responders or towing services.

Some implementations of the system 100 may also include communicative couplings between the mobile device 110 and a general purpose network 120 via an access point 122. The general purpose network 120 may include a local area network or other type of suitable network (e.g., the Internet, a metropolitan area network (MAN), a wide area network (WAN), a wired or wireless network, a private network, a virtual private network, etc.). For example, the mobile device 110 may connect to the Internet via a WiFi connection.

In some implementations, the mobile device 110 may be communicatively coupled to one or more both of the PSTN 114 and the general purpose network 120, and the PSTN 114 and the general purpose network 120 may be communicatively connected to each other. In this way, the mobile device 110 may communicate with the dispatch center 118 via the base station 116 or the access point 122. Similarly, the mobile device 110 may communicate with a remote monitoring server 124 via the base station 116 or the access point 122 (i.e., via the PSTN 114 or the general purpose network 120). The mobile device 110 may transfer data generated by the installed device 104 to the remote monitoring server 124, and the monitoring server 124 may analyze and utilize the transferred data, as further discussed below.

Exemplary Remote Monitoring Server

In one implementation, the remote monitoring server 124 may include one or more computing devices that receive data indicative of the operation of the vehicle 102, process the received data, and/or automatically make determinations or generate content based upon the processed data. For example, the remote monitoring server 124 may be a computing device operated by an insurance company, and the remote monitoring server 124 may utilize data indicative of the operation of the vehicle 102 (e.g., received from the mobile device 110) to determine appropriate rates for customers, make safe driving recommendations to customers, evaluate the risk of certain vehicle operators or certain vehicles, etc. In another example, the remote monitoring server 124 may be a computing device operated by a fleet management company, and the remote monitoring server 124 may utilize data indicative of the operation of the vehicle 102 to evaluate the performance of drivers, track and schedule routes, optimize pricing, etc. Generally, any suitable company, organization, or entity may operate the remote monitoring server 124 to make decisions or generate content based upon data indicative of the operation of the vehicle 102.

The remote monitoring server 124 may include one or more processors 126 (or microprocessors), a non-transitory server memory 130, and a network interface 128, all of which may be interconnected via an address/data bus (not shown). The non-transitory server memory 130 may store computer-executable instructions, which may be executed by the processors 126. In particular, the server memory 130 may store a data analysis module 132 utilized by the remote monitoring server 124 to analyze received data and a data storage and retrieval module 134 utilized by the remote monitoring server 124 to store and retrieve received data. The non-transitory server memory 130 may be implemented in a known form of computer storage media, including but not limited to, semiconductor memories, magnetically readable memories, and/or optically readable memories, for example, but does not include transitory media such as carrier waves.

In some embodiments, the remote monitoring server 124 may also include, or otherwise be communicatively connected to, an monitoring database 140 or other data storage mechanism (e.g., one or more hard disk drives, optical storage drives, solid state storage devices, etc.). The remote monitoring server 124 may store some or all of the data, received from the mobile device 110, in the monitoring database 140, such that the stored data may be analyzed over time or at future times.

Although one remote monitoring server 124 and one monitoring database 140 are illustrated in FIG. 1, it is understood that remote computing devices communicatively coupled to the vehicle 102 may include any number of computing devices and/or data storage devices communicatively connected via any number of networks.

Exemplary Installed Device

Figure 2:
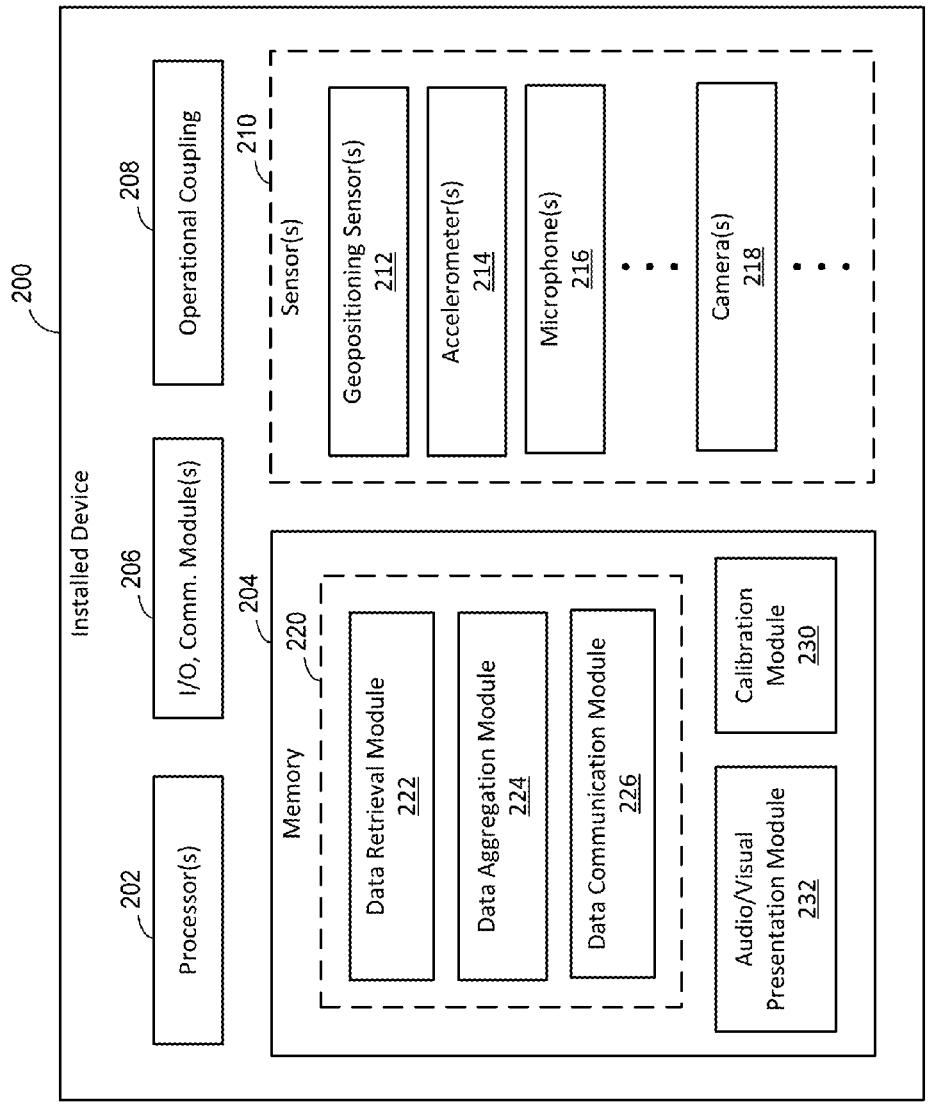
FIG. 2 is a simplified and exemplary block diagram of an installed device which may be implemented in the system illustrated in FIG. 1.

FIG. 2 is a block diagram of an exemplary installed device 200. The system 100 may, for example, implement the installed device 200 as the installed device 104. As discussed with reference to FIG. 1, the installed device 200 may be a head unit configured to be fixedly installed in a vehicle (e.g., in the dash of a vehicle).

The installed device 200 may include one or more processors 202 (or microprocessors), a non-transitory memory 204, one or more input/output and communications module(s) 206, an operational coupling 208, and one or more sensor(s) 210 all of which may be interconnected via an address/data bus (not shown). The non-transitory memory 204 may store computer-executable instructions, which may be executed by the processors 202 and which may specially configure the installed device 200. The non-transitory memory 204 may be implemented in a known form of computer storage media, including but not limited to, semiconductor memories, magnetically readable memories, and/or optically readable memories, for example, but does not include transitory media such as carrier waves.

In some implementations, the operational coupling 208 may connect the installed device 200 to a vehicle in which it is installed. For example, the operational coupling 208 may include various wiring harnesses, jacks, adapters, etc. to electrically couple the installed device 200 to a vehicle and various brackets, screws, bolts, clips, etc. to fixedly secure the installed device within the vehicle (e.g., in a dash of the vehicle). The operational coupling 208 may allow power from a battery of a vehicle to power the installed device 200, even when a motor or engine of the vehicle is off. Further, the operational coupling 208 may allow the installed device 208 to present audio and/or visual content to operators or passengers of a vehicle via one or more audio/visual presentation components (e.g., speakers) distributed within the vehicle.

The input/output and communications module(s) 206 of the installed device 200 may facilitate communications between the installed device 200 and a mobile device, such as the mobile device 110, disposed in a vehicle, in some implementations. For example, the input/output and communications module(s) 206 may include modules implementing Bluetooth or other wireless interfaces for wireless communication between the installed device 200 and one or more mobile devices disposed within a vehicle. The input/output and communications module(s) 206 may also allow the installed device 200 to receive content (music, video, etc.) for presentation to operators or passengers. To this end the input/output and communications module(s) 206 may include stereo jacks, USB ports, touchscreens, CD drives, DVD drives, etc.

The installed device 200 may monitor the operation of a vehicle, in which the installed device 200 is installed, with the one or more sensor(s) 210 built into the installed device 200. By way of example, the installed device 200 may include geopositioning sensor(s) 212 (e.g., GPS sensors) to detect locations and speeds of a vehicle, accelerometer(s) 214 to detect accelerations of a vehicle in one or more dimensions, and microphone(s) 216 to detect air pressure waves (e.g., sounds) within a cabin of a vehicle. Generally, however, the installed device 200 may include any number of other sensors to detect other types of information about the operation of a vehicle, such as one or more camera(s) 218, biometric sensor(s), gyroscopes, etc.

In an implementation, the non-transitory memory 204 may include a monitoring engine 220 that specifically configures the installed device 200 to monitor operation of a vehicle with the sensor(s) 210. In particular, the monitoring engine 220 may include a data retrieval module 222, a data aggregation module 224, and a data communication module 226. Although the example monitoring engine 220 includes these three modules, other implementations of installed devices may include any number of separate modules, algorithms, engines, routines, etc. implementing the functionality of the monitoring engine 220.

The example data retrieval module 222 of the monitoring engine 220 may retrieve data from the sensor(s) 210. The data retrieval module 222 may retrieve the data according to any suitable protocols and formats associated with each of the sensor(s) 210 and cause the retrieved data to be available to other modules of the monitoring engine 220. For example, the data retrieval module 222 may retrieve data in the form of comma separated values, tab separated values, text files, time series, etc. The example data aggregation module 224 may reformat, shape, aggregate, or otherwise manipulate the retrieve data to generate bursts of data to be communicated to mobile devices. For example, the data aggregation module 224 may generate bursts of data corresponding to certain portions or parts of a time period during which a vehicle is being operated, or the data aggregation module 224 may generate bursts of data of pre-defined sizes, formats, types, shapes, etc. The example data communication module 226 may cause these bursts of data to be communicated to mobile devices, such as the mobile device 110, via the input/output and communications modules 206.

In addition to the monitoring engine 220, the non-transitory memory 204 may store a calibration module 230, in an implementation. The calibration module 230 may individually calibrate each of the sensor(s) 210 and/or collectively calibrate the sensor(s) 210. For example, the calibration module 230 may utilize certain benchmarks, calibration algorithms, unit tests, etc. to determine one or more adjustments for each of the sensor(s) 210 such that the sensor(s) 210 produce data indicative of accurate locations, speeds, accelerations, etc. of a vehicle. Because the installed device 200 is powered via the operational coupling 208 when a motor or engine of a vehicle is off, at least in some implementations, these calibrations generated by the calibration module 230 may be maintained over time. However, some implementations of the calibration module 230 may initiate calibrations of the sensor(s) 210 at periodic times (every day, every week, etc.) or at otherwise determined times.

Still further, an implementation of the non-transitory memory 204 may include an audio/visual presentation module 232. This audio/visual presentation module 232 may cause content, such as music, phone calls, video, images, etc., to be presented to operators or passengers in a vehicle via one or more audio/visual presentation components, such as the audio/visual presentation components 108. In some scenarios, the audio/visual presentation module 232 may facilitate hands-free interaction (e.g., hands-free calling) between a vehicle operator or passenger and a mobile device in a vehicle, such as the mobile device 110. For example, when the mobile device 110 has initiated a call, the audio/visual presentation module 232 may cause audio from the call to be presented via the audio/visual presentation components 108 (e.g., speakers in a car), and the audio/visual presentation module 232 may utilize the microphones 216 to communicate detected audio within the vehicle back to the mobile device 110.

Exemplary Mobile Device

Figure 3:
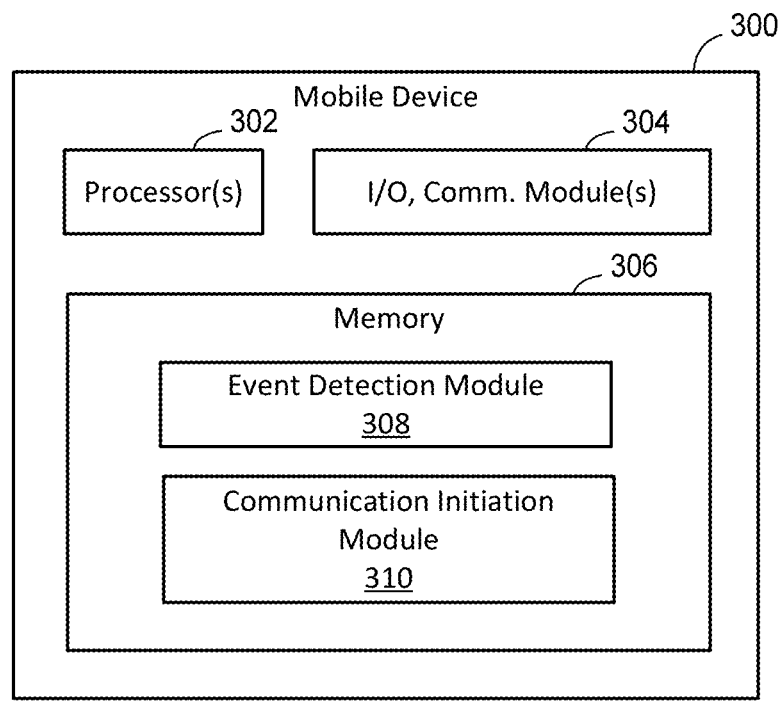
FIG. 3 is a simplified and exemplary block diagram of a mobile device which may be implemented in the system illustrated in FIG. 1.

FIG. 3 is a block diagram of an example mobile device 300. The system 100 may, for example, implement the mobile device 300 as the mobile device 110. As discussed with reference to FIG. 1, the mobile device 300 may be a personal communication or computing device, such as a smartphone or tablet computer, temporarily disposed in a vehicle.

In some implementations, the example mobile device 300 may include one or more processors 302 (or microprocessors), a non-transitory memory 306, and one or more input/output and communications module(s) 304 all of which may be interconnected via an address/data bus (not shown). Similar to the memories 130 and 204, the non-transitory memory 306 may store computer-executable instructions, which may be executed by the processors 302 and which may specially configure the mobile device 300. The non-transitory memory 306 may be implemented in a known form of computer storage media, including but not limited to, semiconductor memories, magnetically readable memories, and/or optically readable memories, for example, but does not include transitory media such as carrier waves.

In some implementations, the input/output and communications module(s) 304 may facilitate communications between the mobile device 300 and an installed device, such as the installed device 200, and between the mobile device 300 and external entities, such as the dispatch center 118 and the remote monitoring server 124. Specifically, the input/output and communications module(s) 304 may allow the mobile device 300 to receive data from an installed device, initiate communications with external entities, and forward received data to external entities.

The example non-transitory memory 306 may include an event detection module 308 specifically configuring the mobile device 300 to detect events occurring during the operation of a vehicle, such as the vehicle 102. By way of example, the event detection module 308 may detect events such as collisions of a vehicle with external objects, emergency health scenarios (e.g., operators or passengers having a heart attack or stroke), impaired driving, mechanical or electrical malfunctioning of components of a vehicle, etc. To this end, the event detection module 308 may employ a sensor fusion algorithm (e.g., utilizing Kalman filters, Bayesian networks, central limit theorems, or Demster-Shafer theory), a decision tree algorithm, or another suitable algorithm that detects events based upon a received data from an installed device. Further details of an example algorithm that may be utilized by the event detection module 308 are discussed with reference to FIG. 4.

In some implementations, the non-transitory memory 306 of the mobile device 300 may also include a communication initiation module 310. The communication initiation module 310 may initiate communication sessions, involving transfers of data and signaling information, between the mobile device 300 and an installed device in a vehicle. For example, the communication initiation module 310 may initiate a communication session over a Bluetooth or WiFi link between the mobile device 300 and the installed device 200. Using this communication session, the mobile device 300 may receive data indicative of the operation of a vehicle from the installed device 200. The communication initiation module 310 may also initiate communications sessions between the mobile device 300 and an entity outside of the vehicle, such as a dispatch center or a remote monitoring server. For example, the communication initiation module 310 may initiate a call to a dispatch center when an event, such as a collision, is detected, as further discussed with reference to FIG. 5.

In some scenarios, the mobile device 300 may initiate communications sessions with both an installed device inside of a vehicle and an entity outside of a vehicle. In these scenarios, the mobile device 300 may utilize the communication session with the installed device to facilitate hands-free operation of the mobile device 300. For example, the mobile device 300 may initiate a communications session (e.g., via Bluetooth) with the installed device 200 and initiate a call with a dispatch center. During the call, the installed device 200 may detect speech (e.g., via a microphone) and forward data indicative of the speech to the mobile device 300, such that the mobile device 300 may communicate signals indicative of the speech to the dispatch center. The installed device 200 may also receive information indicative of received audio signals from the dispatch center via the communications session and "play" the audio signals via one or more speakers in a vehicle. In this manner, a communications session between the mobile device 300 and the installed device 200 may facilitate "hands-free calling."

Exemplary Event Detection

Figure 4:
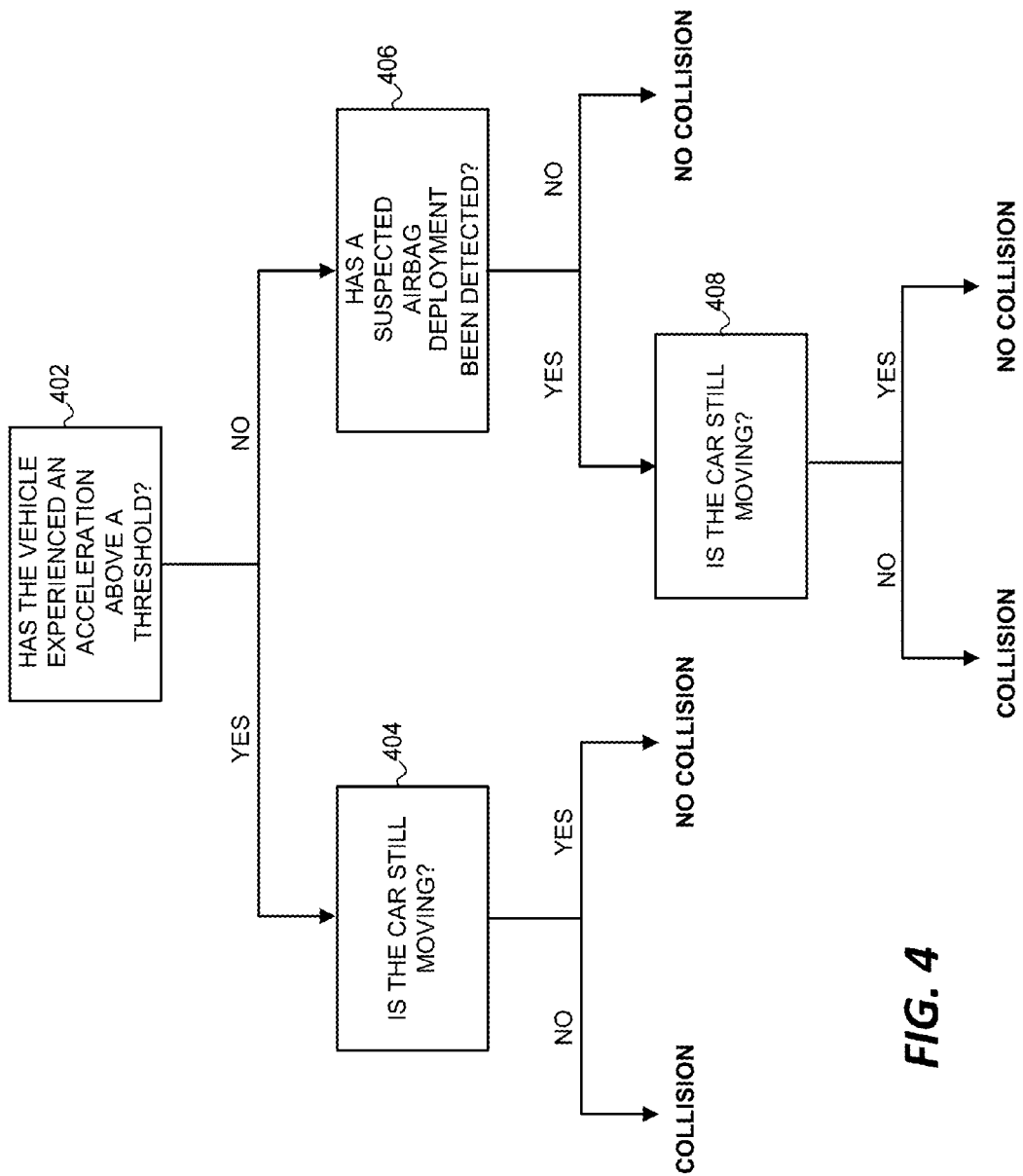
FIG. 4 is a simplified block diagram of an exemplary algorithm which may be implemented by the mobile device illustrated in FIG. 3.

FIG. 4 illustrates an example event detection algorithm 400. The event detection module 308 of the mobile device 300 may utilize the algorithm 400 to detect events based upon data received from an installed device, for example. Although the algorithm 400 illustrates the detection of a collision (e.g., a collision between a vehicle and another vehicle), mobile devices may detect any number of events other than collisions based upon data received from an installed device, such as impaired driving events (e.g., reckless swerving of a vehicle), emergency health events (e.g., heart attacks or strokes of a vehicle operator), mechanical malfunction events (e.g., tire blowouts), etc.

The algorithm 400 may be a decision tree and/or sensor fusion algorithm, in some implementations. In particular, the event detection module 308 may execute the algorithm 400 based upon multiple types of data (generated by multiple types of sensors) received from an installed device, such as the installed device 200, rather than determining any results based upon a single type of data (generated by a single sensor). Data from multiple sensors, such as geopositioning sensors, accelerometers, and microphones, may be "fused," or utilized collectively to detect an event. The algorithm 400 is illustrated as a tree of decisions, or a decision tree, having multiple "nodes," each corresponding to a decision that allows the algorithm 400 to gain information. However, algorithms utilized by an event detection module may be structured in any suitable manner other than a decision tree.

In the algorithm 400, the event detection module 308 may determine if an acceleration above a threshold has been detected. The event detection module 308 may complete this determination based upon data generated by one or more accelerometers in an installed device, such as the installed device 200.

If the event detection module 308 determines that an acceleration above a threshold has occurred, the event detection module 308 may follow the tree structure of the algorithm 400 to node 404, where the event detection module 308 determines if the vehicle is still moving. The event detection module 308 may, for example, utilize data from geopositioning sensors (e.g., GPS sensors or WiFi signal sensors) in an installed device to determine a speed of the vehicle after the determined airbag deployment. If the vehicle is still moving after the airbag deployment, the event detection module 308 may determine that no vehicle collision has occurred. However, if the vehicle is not moving after the determined airbag deployment, the event detection module 308 may determine that a collision has occurred.

If the event detection module 308 determines that an acceleration above a threshold has not occurred, the event detection module 308 may follow the tree structure of the algorithm 400 to node 406, where the event detection module 308 may determine if suspected airbag deployment has been detected at a first node 402 of the algorithm 400. The event detection module 308 may complete this determination based upon data indicative of air pressure waves, or sounds, within a vehicle, where the data is received from an installed device within the vehicle. In some implementations, the event detection module 308 may utilize one or more thresholds to determine if sounds within a vehicle correspond to a suspected airbag deployment. For example, if a volume of sound signals changes by an amount greater than a threshold during a certain time window, the event detection module 308 may determine that a suspected airbag deployment has been detected. In these and/or other implementations, the event detection module 308 may also utilize sound "profiles" to determine if a suspected airbag deployment has been detected. For example, the event detection module 308 may compare sounds during a certain time window to reference sound profiles of airbag deployments to determine if detected sounds correspond to a suspected airbag deployment. If a suspected airbag deployment has not been detected, the event detection module 308 may determine that no collision has occurred, and, if a suspected airbag deployment has been detected, the event detection module 308 may follow the tree structure of the algorithm 400 to node 408, which node 408 is similar to node 404.

Although this algorithm 400 illustrates example uses of data received from an installed device, algorithms utilized by an event detection module 308 may utilize data in other manners and/or may utilize other types of data from an installed device. For example, the event detection module 308 may analyze sound signals to recognize certain voice patterns in the sound signals, subtract or analyze background noise, etc. In other examples, the event detection module 308 may utilize data from gyroscopes, biometric sensors, force sensors, etc. in addition to or instead of the data discussed above.

Exemplary Communications Based Upon Detected Events

Figure 5:
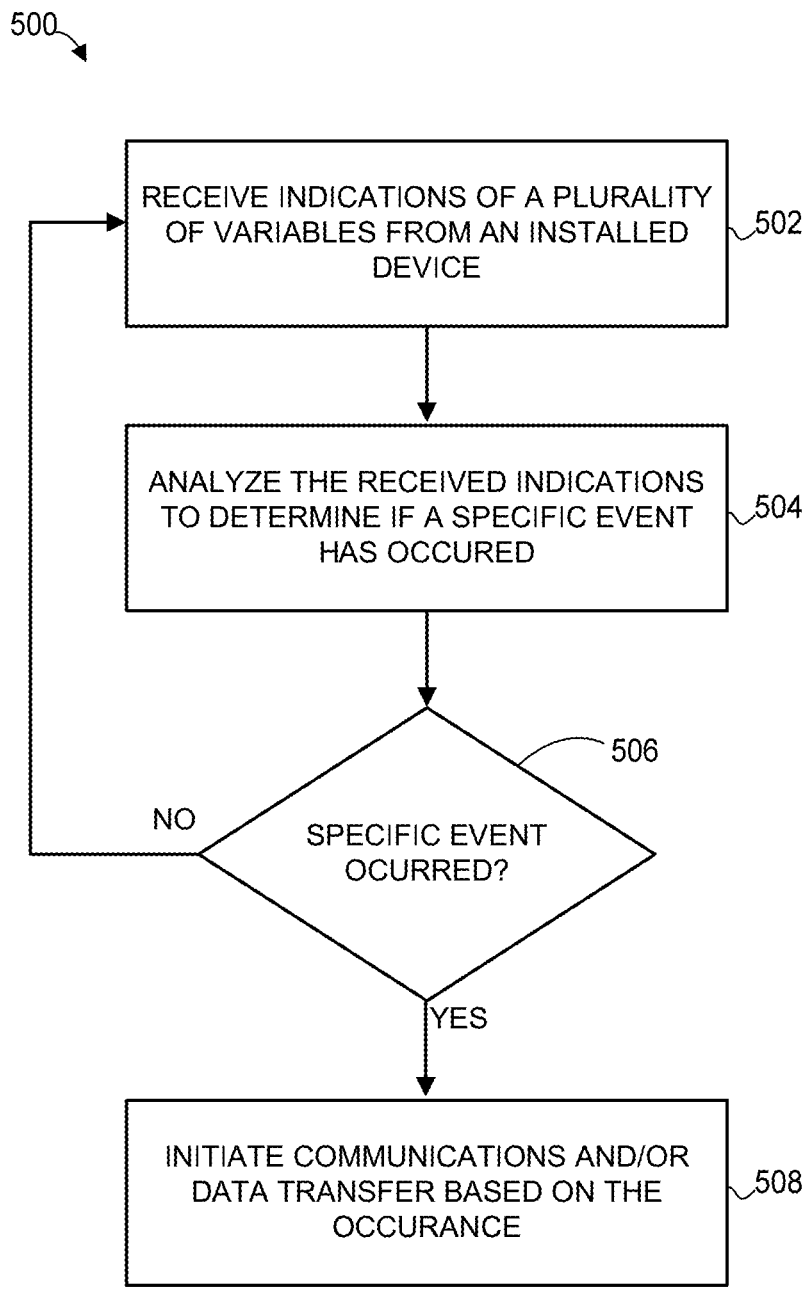
FIG. 5 is a flow chart illustrating an exemplary method for initiating communications based upon detected events occurring during operation of a vehicle.

FIG. 5 is a high level flow chart of an exemplary method 500, or routine or process, for initiating communications based upon detected events. The mobile device 300 may implement some or all of the functionality discussed with reference to FIG. 5, for example.

In the method 500, indications of a plurality of variables are received from an installed device (block 502). For example, the mobile device 300 may receive data indicative of the operation of a vehicle from the installed device 200, wherein the data indicative of the operation includes indications of a plurality of variables. In an implementation, the plurality of variable may include a speed of a vehicle, a location of the vehicle, sounds volume within the vehicle, and acceleration of the vehicle. The indications of the plurality of vehicles may indicate values of these variables at multiple times during a time period or a portion of a time period, where the vehicle is being operated during the time period. That is the indications of the plurality of variable may, at least in some implementations, include time series indicating speed, location, volume, and acceleration at multiple times.

Next, the indications of the plurality of variables are analyzed to determine if an event has occurred (block 504). The mobile device 200 may utilize the example algorithm 400 or another suitable algorithm to collective analyze at least some of the received indications. For example, based upon speeds, accelerations, and volumes of sound corresponding to a vehicle, the mobile device 200 may determine whether a collision has occurred.

Based upon the occurrence or absence of the event (e.g., collision), the flow of the method 500 may continue to block 508 or revert to block 502 (block 506). If the event is detected, communications and/or transfers of data to entities outside of the vehicle are initiated (block 508). In the scenario in which a collision is detected, the mobile device 300 may automatically initiate a phone call between the mobile device 300 and a dispatch center, such as the dispatch center 118. In this manner, the method 500 may automatically communicatively connect a vehicle to emergency or road side services via the mobile device 300. In some implementations, the mobile device 300 may also transfer some or all of the data, received at block 502, to an external entity. For example, the mobile device 300 may transfer a location of a vehicle to a dispatch center, such that the dispatch center may dispatch emergency service to the location. In other examples, the mobile device 300 may transfer data indicative of accelerations, sounds, etc. such that a dispatch center may triage an accident to determine what types of emergency service are to be dispatched.

Exemplary Monitoring Vehicle Operation & Transferring Data

Figure 6:
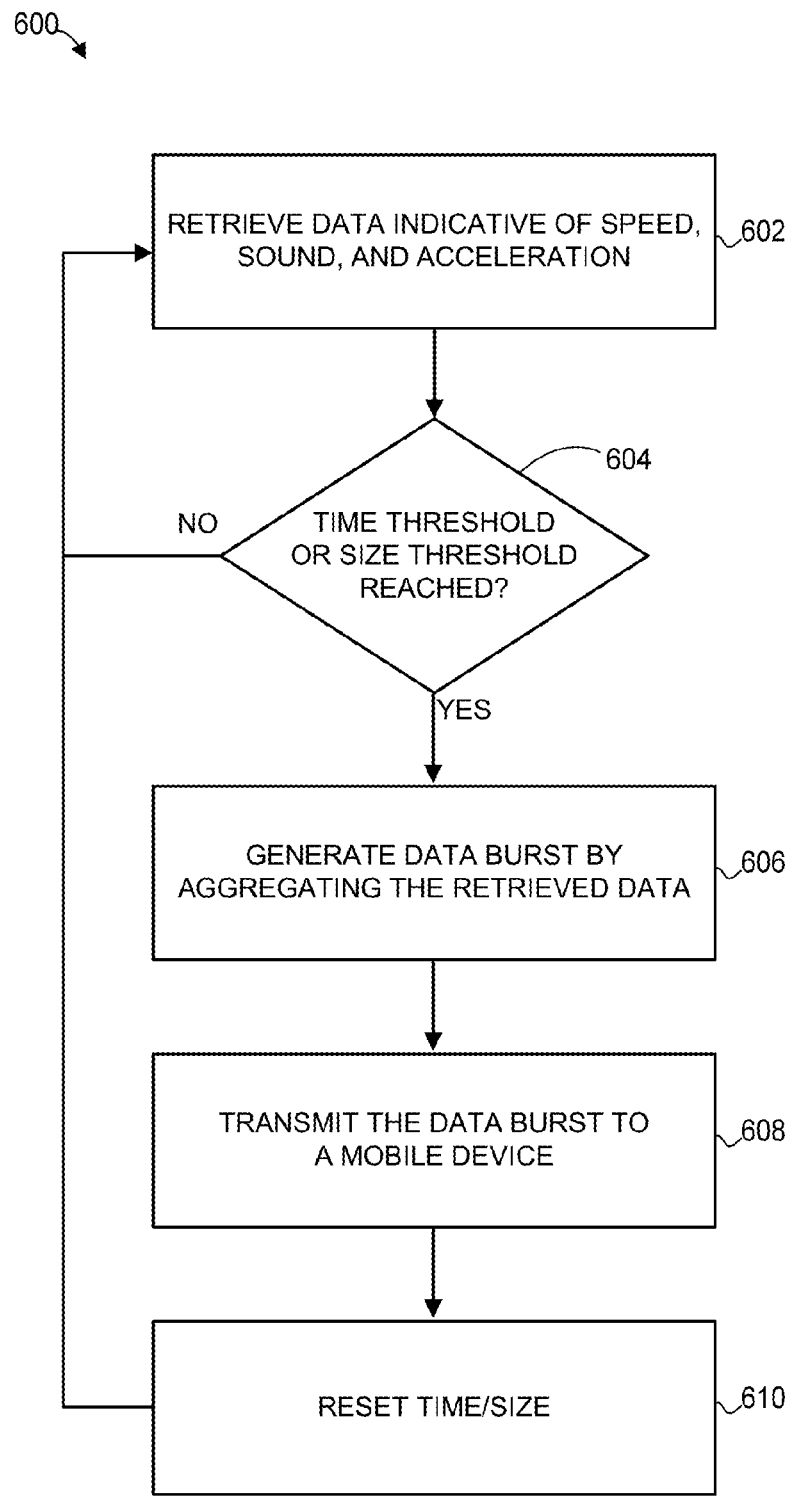
FIG. 6 is a flow chart illustrating an exemplary method for transmitting data indicative of operation of a vehicle to a mobile device disposed in the vehicle.

FIG. 6 is a high level flow chart of an exemplary method 600, or routine or process, for monitoring an operation of a vehicle and transferring data indicative of the operation. The installed device 200 may implement some or all of the functionality discussed with reference to FIG. 5, for example.

In the method 600, data indicative of speed of a vehicle, sound within the vehicle, and acceleration of the vehicle is retrieved (block 602). For example, the installed device 200 may utilize the data retrieval module 222 to retrieve data indicative of speed, acceleration, and/or sound from the sensor(s) 210.

Next, it may be determined if a time threshold or size threshold has been reached (block 604). That is, the installed device 200 may, in some implementations, collect data for a certain time period or portion of a time period (e.g., a number of seconds or minutes) before aggregating and transmitting this data. Further, in these and/or other implementations, the installed device 200 may collect data up to some size (e.g., in terms of bytes) before aggregating and transmitting this data. If the time threshold or size threshold has not been reached, the flow of method 600 reverts to block 602 where more data is retrieved. If the time threshold or size threshold has been reached, the flow continues to block 606.

At block 606, a data burst may be generated. The data aggregation module 224 may transform the retrieved data (from block 602) into a "burst" of data to be transmitted to a mobile device within the vehicle. This burst of data may be a collection of data of a certain size, a certain format, a certain protocol, etc. such that the burst of data may be communicated over a communicative link between the installed device 200 and a mobile device, such as the mobile device 300. By way of example, the data aggregation module 224 may reformat or resample the data retrieved at block 602 to generate the data burst. Further, the data aggregation module 224 may generate the data burst according to one or more standards or protocols, such as HTTP or JSON, such that the data burst may be transferred to and decoded by the mobile device 300.

The data burst may then be transmitted (block 608). For example, the installed device 200 may transmit the burst of data to the mobile device 300 via a Bluetooth or other wireless connection. The installed device 200 may also reset a time or size (block 610). In other words, if the installed device 200 is keeping track of a size of data collected or a time during which data is collected, the installed device 200 may reset this size or time such that data may be gathered for a subsequent burst of data.

By communicating bursts of data to a mobile device in a vehicle, an installed device need not be capable of transmitting data to an entity outside of the vehicle. Rather the installed device may utilize existing connectivity of the mobile device. This may allow, in some implementations, the installed device to be utilized to monitor operation of the vehicle with monthly charges or fees.

Exemplary Computer-Implemented Method

In one aspect, a computer-implemented method for detecting an event occurring during operation of a vehicle may be provided. The method may include (1) during the operation of the vehicle by a vehicle operator, receiving, at a mobile device, indications of a plurality of variables from an installed device communicatively coupled to the mobile device via an internal communication link. The plurality of variables may be monitored by the installed device during the operation of the vehicle, and/or the mobile device may be one of a smartphone, tablet computer, or wearable computing device. The installed device may be fixedly installed in the vehicle. The method may include (2) analyzing, by an event detection module specifically configuring the mobile device, the received indications of the plurality of variables to detect the event occurring during the operation of the vehicle; and/or (3) upon detecting the event, initiating, by a communication initiation module further configuring the mobile device: (i) a first communication session between the mobile device and an entity outside of the vehicle via an external communication link between the mobile device and the entity, and/or (ii) a second communication session between the mobile device and the installed device via the internal communication link between the mobile device and the installed device. The mobile device may forward content communicated via the first communication session to the installed device via the second communication session such that the installed device presents the content to the vehicle operator. The method may include additional, less, or alternate actions, including those discussed elsewhere herein.

For instance, the method may include forwarding, from the mobile device via the external communication link, the received indications of the plurality of variables to a remote computing device, and/or the remote computing device may be located outside of the vehicle.

Receiving the indications of the plurality of variables may include receiving at least two of indications of accelerations of the vehicle, indications of locations of the vehicle, indications of speeds of the vehicle, indications of directions of travel of the vehicle, indications of sounds within the vehicle, images of the vehicle operator, images of the environment surrounding the vehicle, and/or indications of distances between the vehicle and objects outside of the vehicle. Additionally or alternatively, receiving the indications of the plurality of variables includes receiving at least three of indications of accelerations of the vehicle, indications of locations of the vehicle, indications of speeds of the vehicle, indications of directions of travel of the vehicle, indications of sounds within the vehicle, images of the vehicle operator, images of the environment surrounding the vehicle, and/or indications of distances between the vehicle and objects outside of the vehicle.

Initiating the second communication session via the internal communication link may include initiating the second communication session via a Bluetooth link between the mobile device and the installed device. Initiating the first communication session via the external communication link may include initiating the first communication session via a radio frequency link between the mobile device and a cellular network. Additionally or alternatively, initiating the first communication session via the external communication link may include initiating the first communication session via a WiFi link between the mobile device and a local area network.

Analyzing the received indications of the plurality of variables to detect the event may include analyzing the received indications to detect a collision of the vehicle with an object outside of the vehicle. Upon detecting the collision, initiating the first communication session may include initiating a call between the mobile device and one of a first responder, an insurance agency, or a dispatch center.

Analyzing the received indications of the plurality of variables to detect the event may include analyzing the received indications to detect an emergency situation associated with the vehicle operator or associated with the vehicle. Upon detecting the collision, initiating the first communication session may include initiating a call between the mobile device and one of a first responder or a dispatch center.

Initiating the first communication session includes initiating a call between the mobile device and the entity, and/or initiating the second communication session may include initiating the second communication link such that audio from the initiated call is forwarded as part of the second communication session to the installed device and played for vehicle operator through one of more speakers installed in the vehicle.

Initiating the first communication session may include initiating a call between the mobile device and the entity, and/or initiating the second communication session may include initiating the second communication link such that speech from the vehicle operator is detected by the installed device and forwarded to the mobile device from the installed device as part of the second communication session. Additionally or alternatively, initiating the first communication session may include initiating a transfer of at least some of the received indications of the plurality of variables from the mobile device to the entity.

Analyzing the received indications of the plurality of variables to detect the event may include executing a specifically configured sensor fusion algorithm, and/or the specifically configured sensor fusion algorithm may combine the received indications of the plurality of variables to detect the event. Additionally or alternatively, analyzing the received indications of the plurality of variables to detect the event may include executing a decision tree algorithm based upon multiple of the indications of the plurality of variables.

Analyzing the received indications of the plurality of variables to detect the event may include: determining that an airbag of the vehicle has been deployed based upon an indication of sounds within the vehicle; and/or determining that the vehicle has stopped based upon an indication of a speed of the vehicle. Additionally or alternatively, analyzing the received indications of the plurality of variables to detect the event may include: determining that the vehicle has experience an acceleration above a threshold based upon an indication of an acceleration of the vehicle; and/or determining that the vehicle has stopped based upon an indication of a speed of the vehicle. Analyzing the received indications of the plurality of variables to detect the event may further include determining that an airbag of the vehicle has been deployed based upon an indication of sounds within the vehicle.

Additional Exemplary Computer-Implemented Method

In one aspect, a method of monitoring an operation of a vehicle and communicating information indicative of the operation may be provided. The method may include: (1) during a time period in which the vehicle is operated by a vehicle operator, monitoring, by a data gathering module specifically configuring an installed device: (i) a location of the vehicle with geopositioning sensors, (ii) sounds within the vehicle with microphones, and/or (iii) an acceleration of the vehicle with accelerometers. The installed device may be fixedly installed within the vehicle, and/or the geopositioning sensors, the microphones, and/or the accelerometers may be built into the installed device. The method may include, at each of a plurality of times during the time period: (2) generating, by a data aggregation module specifically configuring the installed device, a burst of data including indications of the location of the vehicle, the sounds within the vehicle, and/or the acceleration of the vehicle monitored during a part of the time period preceding the time, and/or (3) transferring, by a data communication module specifically configuring the installed device, the burst of data to a mobile device via a wireless communicative coupling. The mobile device may be one of a smartphone, a tablet computer, and/or a wearable computing device temporarily disposed within the vehicle. The method may include additional, less, or alternate actions, including those discussed elsewhere herein.

The method may include prior to monitoring the location of the vehicle, the sounds of the vehicle, and/or the acceleration of the vehicle, calibrating, with a calibration module specifically configuring the installed device, at least one of the geopositioning sensors, the microphones, and/or the accelerometers to produce a calibration of the at least one of the geopositioning sensors, the microphones, or the accelerometers.

The method may include maintaining, by the calibration module, the calibration of the at least one of the geopositioning sensors, the microphones, or the accelerometers during the time period in which the vehicle is operated and during a non-operating time period, and/or an engine or motor of the vehicle is not operating during the non-operating time period.

The method may include monitoring, by a data gathering module specifically configuring the installed device, a speed of the vehicle based upon changes in the monitored location of the vehicle, and at each of the plurality of times during the time period, generating the burst of data includes generating the burst of data including indications of the speed of the vehicle.

The method may include monitoring, by a data gathering module specifically configuring the installed device, a stationarity of the vehicle, and the stationarity indicates whether the vehicle is moving or stationary, and/or at each of the plurality of times during the time period, generating the burst of data may include generating the burst of data including indications of the stationarity of the vehicle.

Exemplary Computer Systems

In one aspect, a computer system for detecting events occurring during an operation of a vehicle may be provided. The system may include (1) an internal communicative coupling between a mobile device and an installed device, the mobile device may be one of a smartphone, tablet computer, or wearable computer temporarily disposed in the vehicle, and the installed device may be fixedly installed in the vehicle; (2) an external communicative coupling between the mobile device and an external entity, the external entity may be outside of the vehicle; and (3) the mobile device, the mobile device may be specifically configured by computer-executable instructions stored on a non-transitory memory of the mobile device such that, when executed by one or more processors of the mobile device, the computer-executable instructions may cause the mobile device to: (a) during the operation of the vehicle by a vehicle operator, receive, at a mobile device via the internal communicative coupling, indications of a plurality of variables from the installed device, wherein the plurality of variables are monitored by the installed device during the operation of the vehicle, (b) analyze the received indications of the plurality of variables to detect an event occurring during the operation of the vehicle, and (c) upon detecting the event, at least one of: (i) initiate an external communication session between the mobile device and the external entity via the external communication link, or (ii) transmit at least some of the received indications of the plurality of variables to the external entity via the external communication link. The system may include additional, less, or alternate functionality, including that discussed elsewhere herein.

For instance, the installed device may be a head unit fixedly installed in the vehicle, and the head unit may be separate from an on-board computer of the vehicle. The internal communicative coupling may include a Bluetooth link, and/or a WiFi link.

The external communicative coupling may be a radio frequency link to a cellular network, and/or a WiFi link. The external entity may be a dispatch center, and/or may be an insurance company.

Exemplary Device

In another aspect, an installed device for monitoring an operation of a vehicle may be provided. The device may include an operational coupling between the installed device and the vehicle, wherein the operational coupling couples the installed device to the vehicle as a head unit; a communicative coupling between the installed device and a mobile device, wherein the mobile device is one of a smartphone, tablet computer, or wearable computer temporarily disposed in the vehicle; one or more sensors configured to, during a time period corresponding to the operation of the vehicle, monitor: (i) a location of the vehicle, (ii) sounds within the vehicle, and/or (iii) an acceleration of the vehicle, and/or generate indications of the location of the vehicle, the sounds within the vehicle, and the acceleration of the vehicle; a data aggregation module; and/or a data communication module, and at each of a plurality of times during the time period: the data aggregation module may generate a burst of data including indications of the location of the vehicle, the sounds within the vehicle, and/or the acceleration of the vehicle monitored during a part of the time period preceding the time, and/or the data communication module may transmit the burst of data to a mobile device via the communicative coupling.

The operational coupling may couple the installed device to the vehicle as the head unit such that the installed device may provide audio or visual content to vehicle operators and passengers. The operational coupling may provide power to the installed device both when an engine or motor of the vehicle is on and when the engine or motor of the vehicle is off. The operational coupling may couple the installed device to the vehicle fixedly within a certain tolerance of the middle of the vehicle, and/or may couple the installed device to the vehicle fixedly within a certain tolerance of the middle of the vehicle.

Exemplary Flowchart

Figure 7:
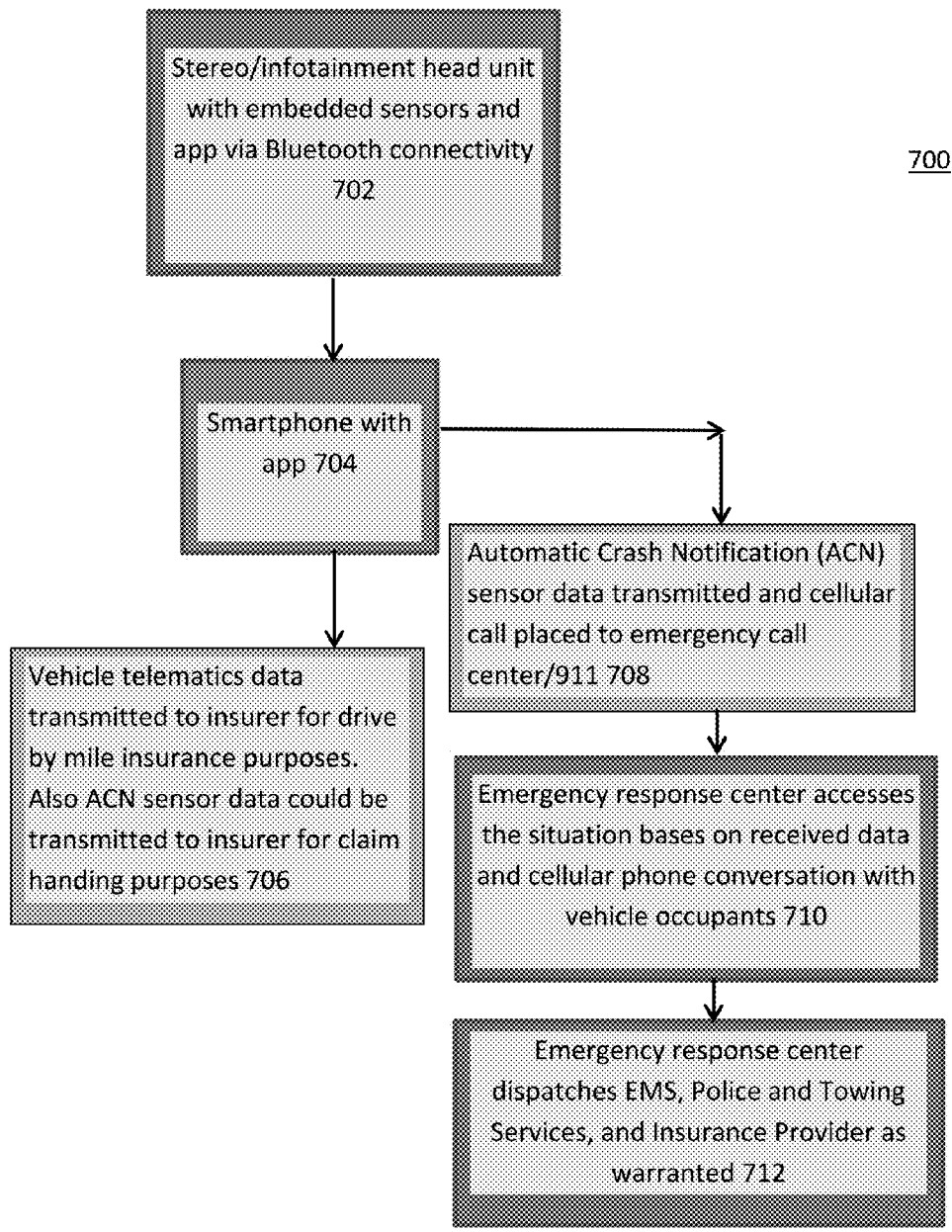
FIG. 7 is an exemplary computer-implemented and system for providing ACN (Automatic Crash Notifications).

FIG. 7 depicts an exemplary flowchart for implementing one embodiment in a computer-implemented method or a computing device/system 700. The method 700 may include providing a stereo/infotainment head unit with embedded sensors and/or an app with Bluetooth connectivity 702. For instance, the Bluetooth connectivity may be with a vehicle controller and/or a mobile device of an insured. The method may include detecting when a mobile device with a similar app is detected by the head unit (and/or vehicle controller) 704.

The method 700 may include collecting, gathering, or generating vehicle telematics and/or other data discussed herein via the head unit, mobile device, and/or vehicle controller 706. The vehicle telematics data may be transmitted via wireless communication and/or data transmission, such as via the head unit, mobile device, and/or vehicle controller, to insurance provider remote server. The insurance provider remote server may perform computer analysis on the telematics received to generate updated auto insurance policy premiums and/or discounts for the insured. The insurance provider remote server may also use the telematics and/or other data received (including vehicle mileage information) for drive by mile purposes. Additionally or alternatively, ACN sensor data may be transmitted to the insurance provider remote server for claim handling purposes, such as pre-populating virtual insurance claims for an insured's review and approval.

The method 700 may include wirelessly contacting emergency responders when an ACN notification is received 708. For instance, ACN sensor data may be transmitted via wireless communication and/or data transmission from the head unit, the mobile device, and/vehicle controller to third party servers, such as remote servers associated with ambulances, police, or fire departments, and/or insurance providers. The remote servers may then notify emergency responders and/or their vehicles directly—such as with accident location and severity information. Additionally or alternatively, based upon an ACN event, the head unit, the mobile device, and/vehicle controller may directly call an emergency call center (such as call 911 with accident severity information and/or accident location data).

The method 700 may include assessing the situation at an emergency response center or insurance provider 710. For instance, an emergency response center and/or insurance provider may access or analyze the sensor data received and/or analysis phone conversations with passengers of the vehicle involved in the accident.

The method 700 may include dispatching assistance to the scene of the vehicle accident 712. For instance, an emergency response center may dispatch EMS, police, and/or towing services to the vehicle accident scene. An insurance provider may dispatch an insurance agent or representative to the scene as well, such as to facilitate helping the insured filing and submitting an auto insurance claim in a convenient and timely manner. The method 700 may include additional, less, or alternate actions, including those discussed elsewhere herein, and/or the method may be implemented via a computer system, one or more local or remote processors (such as dedicated head units, mobile devices, vehicle controllers, vehicle or mobile device sensors, remote servers, etc.), a wireless communication network, and/or computer-executable instructions stored on non-transitory storage media or computer-readable medium.

Exemplary Computer-Implemented Method

In one aspect, a computer-implemented method of emergency response, accident reconstruction, fault determination, and/or auto insurance claim handling may be provided. The method may include (1) detecting, via one or more processors (such as a dedicated head unit, vehicle-mounted processor, vehicle controller, mobile device, dedicated telematics device, and/or vehicle-mounted pressure sensor), a pressure change or wave within a vehicle and/or that a vehicle-mounted airbag has been deployed, or otherwise generating vehicle pressure data; (2) comparing, via the one or more processors, the pressure change or wave and/or airbag deployment data with telematics data collected by the one or more processors (such as the dedicated telematics device, vehicle-mounted processor, vehicle controller, mobile device, dedicated telematics device, and/or vehicle-mounted pressure sensor) to determine that a vehicle accident has occurred and/or a severity of the vehicle accident (or otherwise determining that a vehicle accident has occurred and/or a severity of the vehicle accident based upon computer analysis, via one or more processors, of the vehicle pressure data, airbag deployment data, and/or telematics data collected); (3) based upon the determination that a vehicle accident has occurred and/or a severity of the vehicle accident, generating, via the one or more processors, a request (or wireless communication message) for emergency responders; and/or (4) transmitting, via the one or more processors, the request for emergency responders via wireless communication and/or data transmission, along with a GPS (Global Positioning System) location associated with the vehicle accident to a third party server to facilitate emergency responder response to a scene of the vehicle accident. The method may include additional, less, or alternate actions, including those discussed elsewhere herein, and/or the method may be implemented via a computer system, one or more local or remote processors (such as a dedicated head unit, mobile device, vehicle controller, vehicle or mobile device sensor, remote server, dedicated telematics device, etc.), a wireless communication network, and/or computer-executable instructions stored on non-transitory storage media or computer-readable medium.

For instance, the method may include (a) transmitting, via the one or more processors, the vehicle pressure data, airbag deployment data, and/or telematics data (such as vehicle acceleration, braking, speed, or cornering) to an insurance provider remote server; (b) virtually reconstructing, via the insurance provider remote server or processors, a series of events leading up and including the vehicle accident from computer analysis of the vehicle pressure data, airbag deployment data, and/or telematics data; and/or (c) assigning fault for the vehicle accident, via the insurance provider remote server, based upon the virtual reconstruction of the vehicle accident and/or computer analysis of the vehicle pressure data, airbag deployment data, and/or telematics data to facilitate handling auto insurance claims.

The method may include (i) generating and/or pre-populating, via the insurance provider remote server, a proposed auto insurance claim for the insured based upon the vehicle pressure data, airbag deployment data, and/or telematics data; (ii) transmitting, via the insurance provider remote server, the proposed auto insurance claim to the mobile device of the insured for their review; and/or (iii) displaying, via the insured's mobile device, the proposed auto insurance claim for the insured's review, approval, and/or modification to facilitate efficient auto insurance claim handling.

The method may include determining from computer analysis of the vehicle pressure data (and/or airbag deployment data), which may include interior vehicle pressure information, sound information, and/or airbag deployment information (and/or from triangulation of vehicle pressure, airbag deployment, and/or telematics data received from vehicle-mounted sensors), a location of first impact associated with the vehicle accident to facilitate determining fault determination and/or accident reconstruction. Additionally or alternatively, the method may include determining, via one or more local or remote (to the vehicle) processors, from computer analysis of the location of first impact associated with the vehicle accident and telematics data (acceleration, deceleration, braking, corning, speed, etc.) to facilitate determining fault determination and/or accident reconstruction.

The method may include determining from computer analysis of the vehicle pressure data a source of the interior vehicle pressure information, sound information, and/or airbag deployment information to facilitate determining fault determination and/or accident reconstruction, such as determining from computer analysis via one or more processors which airbag(s) deployed during a vehicle accident and/or which was the first airbag to deploy. Additionally or alternatively, the method may include determining, via one or more local or remote (to the vehicle) processors, from computer analysis of which airbags deployed (and/or which was the first airbag to deploy) and telematics data (acceleration, deceleration braking, corning, speed, etc.) to facilitate determining fault determination and/or accident reconstruction.

Exemplary Method

In one aspect, a computer-implemented method of emergency response, accident reconstruction, fault determination, and/or auto insurance claim handling may be provided. The method may include (1) detecting or determining, via one or more processors (such as via a vehicle-mounted processor, pressure sensor, or sound sensor; or a dedicated telematics device, head unit, mobile device, or vehicle controller), that a vehicle-mounted airbag has been deployed; (2) when it is detected that an air big has been deployed, via the one or more processors, determining, via the one or more processors, that a vehicle accident has occurred and/or a severity of the vehicle accident based upon computer analysis of telematics data (acceleration, deceleration, braking, speed, cornering, etc.) collected (such as comparing deceleration or braking information received with pre-determined thresholds associated with historical accident severity); (3) based upon the determination that a vehicle accident has occurred and/or a severity of the vehicle accident, generating, via the one or more processors, a request (such as a wireless communication message) for emergency responders; and/or (4) transmitting, via the one or more processors, the request/wireless communication message for emergency responders via wireless communication and/or data transmission, along with a GPS (Global Positioning System) location (associated with the one or more processors, a mobile device, and/or the vehicle) to a third party server (e.g., a server associated with a fire department, police department, hospital, or insurance provider) to facilitate emergency response to a scene of a vehicle accident. The method may include additional, less, or alternate actions, including those discussed elsewhere herein, and/or the method may be implemented via a computer system, one or more local or remote processors (such as a dedicated head unit, mobile device, vehicle controller, vehicle or mobile device sensor, remote server, dedicated telematics device, etc.), a wireless communication network, and/or computer-executable instructions stored on non-transitory storage media or computer-readable medium.

For instance, the method may include transmitting, via the one or more processors, the vehicle pressure data, telematics data (such as vehicle acceleration, deceleration, braking, speed, or cornering), wireless communication message for emergency responders, and/or GPS location (associated with the vehicle accident or insured vehicle) to an insurance provider remote server; virtually reconstructing, via the insurance provider remote server or processors, a series of events leading up and including the vehicle accident from computer analysis of the vehicle pressure data, telematics data, wireless communication message for emergency responders, and/or GPS location; and/or assigning fault for the vehicle accident, via the insurance provider remote server, based upon the virtual reconstruction of the vehicle accident and/or computer analysis of the vehicle pressure data, telematics data, wireless communication message for emergency responders, and/or GPS location to facilitate handling auto insurance claims, such as via the insurance provider remote server (in whole or in part).

The method may include generating and/or pre-populating, via the insurance provider remote server, a proposed auto insurance claim for the insured based upon the vehicle pressure data, telematics data, wireless communication message for emergency responders, and/or GPS location; transmitting, via the insurance provider remote server, the proposed auto insurance claim to the mobile device of the insured for their review; and/or displaying or presenting, via the insured's mobile device, the proposed auto insurance claim for the insured's review, approval, or modification to facilitate efficient auto insurance claim handling.

The method may include determining from computer analysis of the vehicle pressure data, which may include interior vehicle pressure information, sound information, and/or airbag deployment information (and/or from triangulation of vehicle pressure and/or telematics data received from vehicle-mounted sensors), a location of first impact associated with the vehicle accident to facilitate determining fault determination and/or accident reconstruction. The method may include determining, via one or more local or remote (to the vehicle) processors, from computer analysis of the location of first impact associated with the vehicle accident and telematics data (acceleration, deceleration, braking, corning, speed, etc.) to facilitate determining fault determination and/or accident reconstruction.

The method may include determining from computer analysis of the vehicle pressure data a source of the interior vehicle pressure information, sound information, and/or airbag deployment information to facilitate determining fault determination and/or accident reconstruction, such as determining from computer analysis via one or more processors which airbag or airbags deployed during a vehicle accident and/or which was the first airbag to deploy. Additionally or alternatively, the method may include determining, via one or more local or remote (to the vehicle) processors, from computer analysis of which airbags deployed (and/or which was the first airbag to deploy) and telematics data (acceleration, deceleration, braking, corning, speed, etc.) to facilitate determining fault determination and/or accident reconstruction.

Exemplary Head Unit & Mobile Device

In one aspect, a head unit and/or mobile device configured for detecting a vehicle accident may be provided. The head unit and/or mobile device may be configured with one or more processors configured to (such as via computer-readable instructions stored on non-transitory computer medium or media or an application): (1) detect pressure and/or sound data (such as data related to a pressure change or wave within a vehicle) indicative of a vehicle accident or airbag deployment, and/or detect airbag deployment data (e.g., a signal or transmission indicative of a smart airbag deployment for a smart airbag mounted on the vehicle, such as a transmission from a smart airbag processor/transceiver indicating deployment); (2) collect or generate telematics data (such telematics data indicative or vehicle acceleration, deceleration, braking, cornering, or speed in real-time); (3) analyze the pressure and/or sound data, and the telematics data, to determine that a vehicle accident has occurred and/or a severity of a vehicle accident (such as comparing actual acceleration, deceleration, braking, corning, speed, air pressure, or sound of the vehicle with expected acceleration, deceleration, braking, corning, speed, air pressure, or sound of the vehicle); (4) based upon the determination of the vehicle accident and/or the severity of the vehicle accident determined, generate a wireless communication for emergency assistance; and/or (5) transmit, the wireless communication for emergency assistance, along with GPS (Global Positioning System) location of a GPS unit mounted on the mobile device (and/or the pressure and/or sound data, and the telematics data), to a third party remote server to facilitate emergency responders promptly responding to the vehicle accident. The head unit and/or mobile device may be configured with additional, less, or alternate functionality, including that discussed elsewhere herein.

For instance, the head unit or mobile device may be configured to: transmit, via the one or more processors, the wireless communication for emergency assistance, along with the GPS location of a GPS unit mounted on the mobile device, and/or the pressure and/or sound data, and the telematics data to an insurance provider remote server to facilitate the insurance provider remote server or processors (1) virtually reconstructing a series of events leading up and including the vehicle accident from computer analysis of the vehicle pressure and/or sound data, telematics data, wireless communication message for emergency responders, and/or GPS location; and/or (2) assigning fault for the vehicle accident based upon the virtual reconstruction of the vehicle accident and/or computer analysis of the vehicle pressure and/or sound data, telematics data, wireless communication message for emergency responders, and/or GPS location. As a result, auto insurance claims may be automatically handled (in whole or part), such as via the insurance provider remote server.

The head unit or mobile device may be configured to generate and/or pre-populate a proposed auto insurance claim for the insured based upon the vehicle pressure and/or sound data, telematics data, wireless communication message for emergency responders, and/or GPS location; transmit and/or submit the proposed auto insurance claim to the insurance provider remote server; and/or display a notification received from the insurance provider remote server that the auto insurance claim was received to facilitate efficient auto insurance claim handling.

The head unit or mobile device may be configured to determine from computer analysis of the vehicle pressure and/or sound data, which may include interior vehicle pressure or sound information, and/or airbag deployment information (and/or from triangulation of vehicle pressure and/or telematics data received from vehicle-mounted sensors), a location of first impact associated with the vehicle accident to facilitate determining fault determination and/or accident reconstruction; and/or transmit the location of first impact (such as head-on collision) to a third party server to facilitate EMS response, and/or determining fault determination or accident reconstruction. Additionally or alternatively, the head unit or mobile device may be configured to determine from computer analysis of the vehicle pressure data a source of the interior vehicle pressure information, sound information, and/or airbag deployment information to facilitate determining fault determination and/or accident reconstruction, such as determining from computer analysis via one or more processors which airbag or airbags deployed during a vehicle accident and/or which was the first airbag to deploy.

Additional Considerations

Upon reading this disclosure, those of ordinary skill in the art will appreciate still additional alternative structural and functional designs for a system and a method for monitoring operation of a vehicle. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

We claim:

1. A method for detecting an event occurring during operation of a vehicle, the method comprising:
    during the operation of the vehicle by a vehicle operator, receiving, at a mobile device, indications of a plurality of variables from an installed device communicatively coupled to the mobile device via an internal communication link, wherein:
        the plurality of variables are monitored by the installed device during the operation of the vehicle,
        the mobile device is one of a smartphone, tablet computer, or wearable computing device, and
        the installed device is fixedly installed in the vehicle;
    analyzing, by an event detection module specifically configuring the mobile device, the received indications of the plurality of variables to detect the event occurring during the operation of the vehicle; and
    upon detecting the event, initiating, by a communication initiation module further configuring the mobile device:
        (i) a first communication session between the mobile device and an entity outside of the vehicle via an external communication link between the mobile device and the entity, and
        (ii) a second communication session between the mobile device and the installed device via the internal communication link between the mobile device and the installed device, wherein the mobile device forwards content communicated via the first communication session to the installed device via the second communication session such that the installed device presents the content to the vehicle operator.

2. The method of claim 1, further comprising:
forwarding, from the mobile device via the external communication link, the received indications of the plurality of variables to a remote computing device, wherein the remote computing device is located outside of the vehicle.

3. The method of claim 1, wherein receiving the indications of the plurality of variables includes receiving at least two of indications of accelerations of the vehicle, indications of locations of the vehicle, indications of speeds of the vehicle, indications of directions of travel of the vehicle, indications of sounds within the vehicle, images of the vehicle operator, images of the environment surrounding the vehicle, and indications of distances between the vehicle and objects outside of the vehicle.

4. The method of claim 3, wherein receiving the indications of the plurality of variables includes receiving at least three of indications of accelerations of the vehicle, indications of locations of the vehicle, indications of speeds of the vehicle, indications of directions of travel of the vehicle, indications of sounds within the vehicle, images of the vehicle operator, images of the environment surrounding the vehicle, and indications of distances between the vehicle and objects outside of the vehicle.

5. The method of claim 1, wherein initiating the second communication session via the internal communication link includes initiating the second communication session via a Bluetooth link between the mobile device and the installed device.

6. The method of claim 1, wherein initiating the first communication session via the external communication link includes initiating the first communication session via a radio frequency link between the mobile device and a cellular network.

7. The method of claim 1, wherein initiating the first communication session via the external communication link includes initiating the first communication session via a WiFi link between the mobile device and a local area network.

8. The method of claim 1, wherein analyzing the received indications of the plurality of variables to detect the event includes analyzing the received indications to detect a collision of the vehicle with an object outside of the vehicle.

9. The method of claim 8, wherein, upon detecting the collision, initiating the first communication session includes initiating a call between the mobile device and one of a first responder, an insurance agency, or a dispatch center.

10. The method of claim 1, wherein analyzing the received indications of the plurality of variables to detect the event includes analyzing the received indications to detect an emergency situation associated with the vehicle operator or associated with the vehicle.

11. The method of claim 10, wherein, upon detecting the collision, initiating the first communication session includes initiating a call between the mobile device and one of a first responder or a dispatch center.

12. The method of claim 1, wherein initiating the first communication session includes initiating a call between the mobile device and the entity, and wherein initiating the second communication session includes initiating the second communication link such that audio from the initiated call is forwarded as part of the second communication session to the installed device and played for vehicle operator through one of more speakers installed in the vehicle.

13. The method of claim 1, wherein initiating the first communication session includes initiating a call between the mobile device and the entity, and wherein initiating the second communication session includes initiating the second communication link such that speech from the vehicle operator is detected by the installed device and forwarded to the mobile device from the installed device as part of the second communication session.

14. The method of claim 1, wherein initiating the first communication session includes initiating a transfer of at least some of the received indications of the plurality of variables from the mobile device to the entity.

15. The method of claim 1, wherein analyzing the received indications of the plurality of variables to detect the event includes executing a specifically configured sensor fusion algorithm, wherein the specifically configured sensor fusion algorithm combines the received indications of the plurality of variables to detect the event.

16. The method of claim 1, wherein analyzing the received indications of the plurality of variables to detect the event includes executing a decision tree algorithm based upon multiple of the indications of the plurality of variables.

17. The method of claim 1, wherein analyzing the received indications of the plurality of variables to detect the event includes:
determining that an airbag of the vehicle has been deployed based upon an indication of sounds within the vehicle; and
determining that the vehicle has stopped based upon an indication of a speed of the vehicle.

18. The method of claim 1, wherein analyzing the received indications of the plurality of variables to detect the event includes:
determining that the vehicle has experience an acceleration above a threshold based upon an indication of an acceleration of the vehicle; and
determining that the vehicle has stopped based upon an indication of a speed of the vehicle.

19. The method of claim 18, wherein analyzing the received indications of the plurality of variables to detect the event further includes determining that an airbag of the vehicle has been deployed based upon an indication of sounds within the vehicle.

20. A method of monitoring an operation of a vehicle and communicating information indicative of the operation, the method comprising:
during a time period in which the vehicle is operated by a vehicle operator, monitoring, by a data gathering module specifically configuring an installed device:
(i) a location of the vehicle with geopositioning sensors,
(ii) sounds within the vehicle with microphones, and
(iii) an acceleration of the vehicle with accelerometers,
wherein the installed device is fixedly installed within the vehicle, and wherein the geopositioning sensors, the microphones, and the accelerometers are built into the installed device; and
at each of a plurality of times during the time period:
generating, by a data aggregation module specifically configuring the installed device, a burst of data including indications of the location of the vehicle, the sounds within the vehicle, and the acceleration of the vehicle monitored during a part of the time period preceding the time, and
transferring, by a data communication module specifically configuring the installed device, the burst of data to a mobile device via a wireless communicative coupling, wherein the mobile device is one of a smartphone, a tablet computer, or a wearable computing device temporarily disposed within the vehicle.

21. A system for detecting events occurring during an operation of a vehicle, the system comprising:
- an internal communicative coupling between a mobile device and an installed device, wherein the mobile device is one of a smartphone, tablet computer, or wearable computer temporarily disposed in the vehicle, and wherein the installed device is fixedly installed in the vehicle;
- an external communication link between the mobile device and an external entity, wherein the external entity is outside of the vehicle; and
- the mobile device, wherein the mobile device is specifically configured by computer-executable instructions stored on a non-transitory memory of the mobile device such that, when executed by one or more processors of the mobile device, the computer-executable instructions cause the mobile device to:
- during the operation of the vehicle by a vehicle operator, receive, at a mobile device via the internal communicative coupling, indications of a plurality of variables from the installed device, wherein the plurality of variables are monitored by the installed device during the operation of the vehicle,
- analyze the received indications of the plurality of variables to detect an event occurring during the operation of the vehicle, and
- upon detecting the event, at least one of:
  - (i) initiate an external communication session between the mobile device and the external entity via the external communication link, or
  - (ii) transmit at least some of the received indications of the plurality of variables to the external entity via the external communication link.

22. The system of claim 21, wherein the event includes a collision of the vehicle with an object outside of the vehicle.

23. The system of claim 22, wherein, the external entity includes a first responder, an insurance agency, or a dispatch center.

24. The system of claim 21, wherein the event includes an emergency situation associated with the vehicle operator or associated with the vehicle.

25. The system of claim 24, wherein the external entity includes a first responder or a dispatch center.

26. The system of claim 21, wherein the event includes:
- deployment of an airbag of the vehicle based upon an indication of sounds within the vehicle; and
- stoppage of the vehicle based upon an indication of a speed of the vehicle.

27. The system of claim 21, wherein analyzing the received indications of the plurality of variables to detect the event includes:
- vehicle acceleration above a threshold based upon an indication of an acceleration of the vehicle; and
- stoppage of the vehicle based upon an indication of a speed of the vehicle.

28. The system of claim 27, wherein the event includes deployment of an airbag of the vehicle based upon an indication of sounds within the vehicle.

* * * * *